Nov. 21, 1967     A. E. LOMBARD, JR., ET AL     3,354,313
PHOTOSENSITIVE DEVICE FOR INDICATING
POSITION AND INTENSITY WITH
CENTRALLY LOCATED ELECTRODE
Filed May 15, 1963

VOLTAGE VS POSITION OF LIGHT SPOT

INVENTORS
ALBERT E. LOMBARD JR.
JAMES E. DUEKER
BY
Gravely, Lieder & Woodruff
ATTORNEYS

United States Patent Office 3,354,313
Patented Nov. 21, 1967

3,354,313
PHOTOSENSITIVE DEVICE FOR INDICATING POSITION AND INTENSITY WITH CENTRALLY LOCATED ELECTRODE
Albert E. Lombard, Jr., and James E. Dueker, St. Louis County, Mo., assignors to McDonnell Aircraft Corporation, St. Louis, Mo., a corporation of Maryland
Filed May 15, 1963, Ser. No. 280,597
9 Claims. (Cl. 250—212)

The subject invention relates generally to detector devices and more particularly to a detector device for detecting the position and intensity of a light source relative thereto.

Various means and devices have been constructed for measuring the lateral position of a light spot on a surface and also for measuring the intensity of the spot and the source of incidental light that produces the spot. So far as is known, however, no one heretofore has devised or contemplated making a single device capable of measuring both the lateral position or location of a light spot and the intensity thereof and using this information for specific purposes such as in control devices. Furthermore, no one heretofore has devised a detector having the above capabilities which can also be used with all wave lengths of light, depending only upon the materials used in the construction of the detector and the physical characteristics and dimensions thereof.

The principal element or component of the subject device comprises a wafer or disc like detector element formed by two intimately united layers of material having different conductivity characteristics, and having a plurality of spaced electrodes connected to one of said materials. The device also includes voltage responsive means connected between preselected ones of said electrodes, and means for projecting a spot of light on one layer of said detector, said voltage responsive means responding to changes in the lateral position of the light spot on said detector relative to said electrodes. The invention also includes providing another electrode connected to the other layer of said detector and other voltage responsive means connected between said last named electrode and one of the aforesaid electrodes to respond to changes in the intensity of the light spot impinging on the detector. It is also contemplated to arrange the locations of electrodes to more accurately determine the location and changes in location of a light spot on the detector and to make the detector multidirectional.

It is a principal object of the present invention to provide means for determining the position and intensity of a light spot impinging on a detector device.

Another object is to provide means for recording two dimensional location of a light spot and an associated light source relative to another location.

Another object is to provide a relatively simple and accurate means for controlling the movement of an object relative to another object.

Another object is to provide a light detector capable of operating on all wave lengths of light.

Another object is to provide a relative inexpensive photovoltaic light detector device capable of being constructed of many combinations of materials having different conductivity characteristics.

Another object is to provide a light detector capable of being constructed of semi-conductor materials.

Another object is to provide a detector device capable of being constructed with extreme accuracy under controlled conditions.

These and other objects and advantages of the present invention will become apparent after considering the following detailed specification covering several preferred embodiments thereof in conjunction with the accompanying drawing, wherein.

Figure 1:
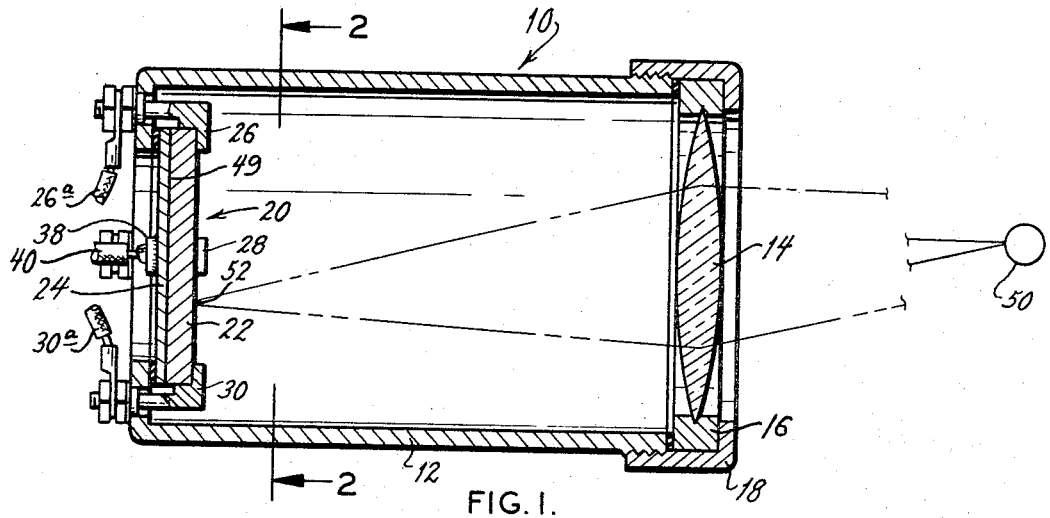
FIG. 1 is a cross-sectional view taken through the center of a detector device constructed according to the present invention.
Figure 2:
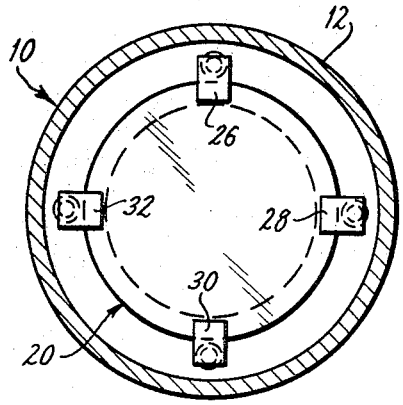
FIG. 2 is a cross-sectional view taken on line 2—2 of FIG. 1.

Referring to the drawing by reference numbers, the number 10 refers to a detector device constructed according to the present invention. The device 10 includes a tubular housing 12 with a lens 14 and lens mounting means 16 mounted at one end thereof and held in position by a threaded closure member 18. A detector element or wafer 20 is mounted at the opposite end of the tubular member 12.

The detector element 20 includes a first layer of material 22 having predetermined conductivity characteristics and a second layer 24 of material intimately engaged with the layer 22 but having different conductivity characteristics than the layer 22. A plurality of spaced electrodes 26, 28, 30 and 32 are attached to the layer 22. The electrodes are also connected respectively to associated leads 26a, 28a, 30a and 32a by means such as the threaded connection means shown in FIG. 1.

Figure 3:
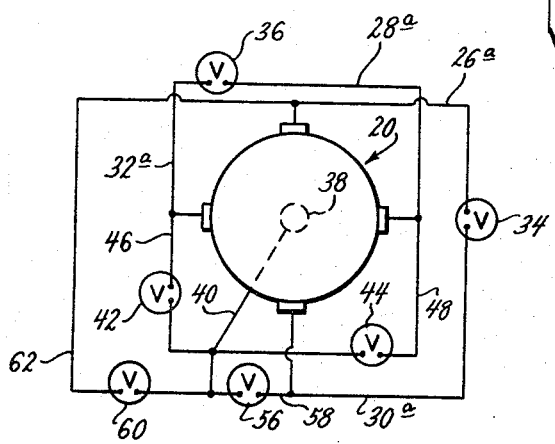
FIG. 3 is a schematic circuit diagram showing the electrical connections for the subject device.

In FIG. 3 is shown a typical circuit for the detector device which has the leads 26a and 30a connected to opposite terminals of a voltmeter 34, and the leads 28a and 32a connected to opposite terminals of another voltmeter 36.

In addition to the above connections, a fifth electrode or terminal 38 may also optionally be provided as shown in FIG. 3. The electrode 38 is connected to the layer 24 and is also connected by lead 40 to one side of four other voltmeters 42, 44, 56 and 60. The opposite side of the voltmeter 42 is connected by lead 46 to the lead 32a and to the electrode 32. In like manner, the opposite side of the voltmeter 44 is connected by a lead 48 to the lead 28a and to the electrode 28; the opposite side of voltmeter 60 is connected by a lead 62 to the lead 26a, and the opposite of voltmeter 56 is connected by a lead 58 to the lead 30a.

As will be shown hereinafter, the voltmeters 34 and 36 are used to determine the location or lateral position of a light spot impinging on the wafer 20, and the voltmeters 42, 44, 56 and 60 are used to determine the intensity of the light spot and/or the distance of the light source from the detector.

Of particular importance to the present invention is the construction and operating characteristics of the detector element 20 including the attachment of the layers 22 and 24 and the attachment thereto of the electrodes 26, 28, 30, 32 and 38. As already mentioned, the detector can be constructed out of many different materials so long as the materials have different conductivity characteristics and desired physical properties. Another requirement of the detector is that it have a junction or a transition zone 49 between the layers of different conductivity. Such a junction can be produced by diffusion of one of the materials into the other thereby causing a reduction in the resistivity of the latter. The depth or penetration of the junction depends upon the diffusion characteristics of both materials including the diffusion coefficient of impurity of the host material, the temperature at which the diffusion takes place, and the time duration of the diffusion. At the time of this writing many different materials have been tested and experimented with for making the detector. Some of the materials have been elements and some semi-conductors and the results have varied depending upon the characteristics of the materials and the characteristics of the junction formed therebetween. Two materials which have been tested as a base or host material include silicon and cadmium sulphide. The choice of these materials has been governed in large measure by the desired peaks obtainable in the spectral response of the cells which is controlled primarily by the energy band gap of the host material.

Lateral cells or detectors 20 constructed of silicon discs having a diameter of approximately .875 inch and a thickness of approximately .020 inch have been made and tested. These disc or wafer forming materials have been doped with impurities which include materials such as aluminum and antimony. In the one case, aluminum is an acceptor and is employed as a dopant for N-type silicon, while in the other case, antimony which is a donor and is employed in P-type silicon. In both cases, the formation of a PN junction was formed by vacuum deposition of the dopant on the host material or wafer, although other methods could also be used and are within the scope of this invention. In the case of vacuum deposition, the dopant is deposited on the silicon wafer with subsequent diffusion of the impurity into the silicon and this is carried out in a carefully controlled temperature environment. There are many different materials that can be used both for the base material and also for the dopant, and it is not intended to limit the present invention to any particular materials and the specific materials suggested are illustrative only. Likewise, it is not intended to limit construction of the subject detectors to a construction in a vacuum deposition process since many other ways are known for forming junctions between materials. The thickness and size of the evaporated or deposited layer of dopant likewise is not critical and will vary substantially depending upon the intensity of the light spot, the type and frequency of the light, the materials selected for the wafer, and the sensitivity requirements desired.

After the detector element 20 has been constructed the electrodes or terminals can be attached to one or both of the detector layers. The electrodes, like the dopant, can also be formed by vacuum evaporation or deposition of suitable materials using suitable meshing means to locate them. The electrical wires can then be connected by soldering or otherwise to the electrodes. It has been found that electrodes having good ohmicity characteristics with little or no rectification characteristics are the most desirable kind for the present device. It is not intended to limit construction of the electrodes to any particular material, however, since there are many good conductor materials that can be used.

A detector of the type described hereinabove is installed in a housing such as the housing 12 shown in FIG. 1 and is aimed at a light source 50 (or a light source is aimed at it). The light from the light source 50 is focused by the lens 14 onto a light spot 52 which impinges on the detector 20. It is not necessary to have sharp focusing to produce the most desirable and useful light spot. Furthermore, it is not necessary to exclude light other that the light from the source 50 since the device can operate if it can distinguish the light from a particular light source 50 from other light. The means for distinguishing the desired light can include frequency discriminating means, chopper means (not shown) for pulsing the desired light and the like. The housing 12 may also be filled with a suitable transparent liquid or gas which can be used to cool the element 20 if this is necessary.

Figure 4:
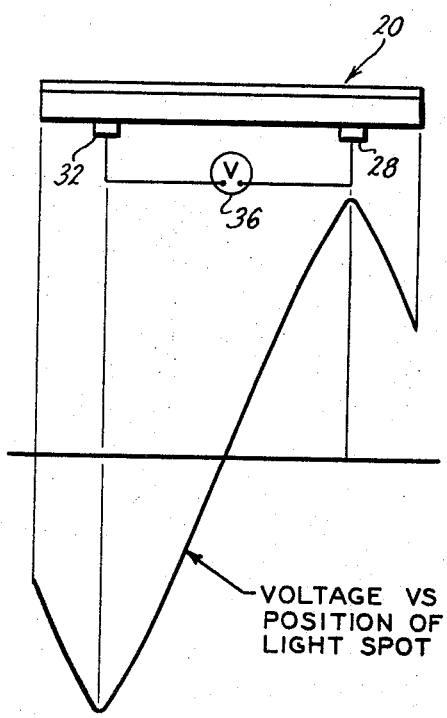
FIG. 4 is a graph of voltage plotted against movement of a light spot across a photovoltaic detector device constructed according to the present invention.

As the light 50 and the detector device 10 are moved relative to each other the light from the light source will be focused on a different spot of the detector 20. This will produce electrons in one of the layers and holes in the other layer in a manner similar to any conventional semi-conductor device having a junction and a signal applied. This condition will produce a voltage difference between any two spaced electrodes. For example, if the light spot initially is close to the terminal 32 (FIG. 4) a voltage of predetermined polarity and magnitude will appear between the electrodes 32 and 28. As the light spot moves across the detector 20 toward the terminal or electrode 28, however, the voltage on the voltmeter 36 will vary from a maximum reading in one direction (or polarity) when the light spot is near the electrode 32 through a zero voltage condition when the light spot is equidistant from both electrodes 32 and 28 to a condition of maximum voltage in the opposite polarity as the light approaches the electrode 28. If four spaced electrodes are provided instead of only two, other voltage readings corresponding to position of the light spot in two different directions, as for example the $x$ and $y$ directions of a coordinate system can be obtained and the location of the light spot can be determined anywhere on the detector surface. This then provides means for detecting location of the light spot in two directions. By being able to locate the light spot anywhere on the detector, it is also possible to locate the light source relative to the detector and this information can be useful in many ways including providing input signals to a computer used in a control or guidance system.

It is also contemplated to connect other voltmeters between the electrode 38 and the electrodes 26, 28, 30 and 32 in order to measure the light intensity. It is also contemplated to increase the number of electrodes on one or both sides of the wafer which may be interconnected by voltmeters to one or more of the present electrodes or which may be interconnected by voltmeters independently of the present electrodes and associated leads.

The present device has many applications and uses and it is not intended to limit it to a particular application or use. There are, however, specific uses and applications for which the present device is particularly well suited. Some of these have already been suggested such as use in a control system for guiding a missile or other vehicle. In a control system such as this the light source and the detector can be installed interchangeably, one being on the controlled vehicle and one at another location such as in another vehicle or at a ground station. The present device can also be used to locate a source of light such as a flash of illumination accompanying an atomic explosion, illumination coming from stars or planets, illuminations from satellites, illuminations to operate control circuits where light may come from more than one direction, and in many other similar situations.

Thus there has been shown and described a novel photovoltaic detector device which fulfills all of the objects and advantages sought therefor. The subject device comprises a light sensitive detector member formed by two layers of material in intimate engagement forming a junction therebetween and each having a different electric conductivity characteristic, at least two spaced electrodes connected to one of said layers and voltage sensitive means capable of responding to the voltage between the said electrodes, said voltage varying in response to movement of a light spot on the surface of one of said layers. The subject invention also includes providing another electrode connected to the other layer, and other voltage sensitive means connected to said other electrode and one of the aforesaid electrodes for measuring the intensity of a light spot impinging upon the detector.

Many changes, variations, modifications and other uses of the subject device will become apparent to those skilled in the art after considering this specification and the accompanying drawings. All such changes, variations, modifications and other uses which do not depart from the spirit and scope of the invention are deemed covered by the invention which is limited only by the claims which follow.

What is claimed is:

1. A light sensitive detector comprising an element having two intimately united layers of materials characterized by having different conductivity characteristics, one of said layers having a surface defining an observation field, a plurality of pairs of electrodes attached to said one layer in positions spaced about the field of observation, means for focusing light from a remote light source into a spot on said one layer in the observation field, means connected between selected pairs of said electrodes including means for sensing electric signals that vary in response to the location in the observation field where the light spot impinges relative to the said selected pairs of electrodes, another electrode attached to the element layer on the opposite side of the element, said other electrode being centrally located relative to the observation field, and means for measuring the intensity of the light spot impinging on the observation field connected between said other electrode and at least one of the aforesaid spaced electrodes, said intensity measuring means including means sensing signals that vary in response to the intensity of the light spot impinging on the observation field.

2. A light sensitive detector comprising a tubular housing having a light sensitive disc located at one end thereof and a lens located in the housing at a position to focus light from a remote light source into a spot on the disc, said disc including first and second layers of semi-conductive material each having different electric conductivity characteristics, said layers being intimately united and having an electrical junction formed therebetween, a plurality of pairs of spaced electrodes attached to said first layer in positions to define therebetween an observation field onto which the focused light spot impinges, means connected between selected pairs of said spaced electrodes for sensing voltages that vary in magnitude in response to the position where the light spot impinges relative to the associated pairs of electrodes, another electrode attached to the second disc layer on the opposite side of the disc and centrally located relative to the observation field, and connected between said other electrode and at least one of the aforementioned electrodes, said last named means including means for producing voltages that vary in response to the intensity of the light spot impinging on the disc.

3. The light sensitive detector defined in claim 2 wherein said tubular housing is filled with a transparent coolant.

4. The light sensitive detector defined in claim 2 wherein said plurality of spaced electrodes includes four electrodes located in opposed pairs on opposite sides of the observation field.

5. The light sensitive detector defined in claim 4 wherein said means connected between said other electrode and at least one of the aforementioned electrodes includes at least two circuits connected respectively between said other electrode and different ones of said spaced electrodes each of said circuits including means capable of producing voltage responses proportional to the intensity of the impinging light spot.

6. A detector comprising a semi-conductor wafer including a host layer of material formed of a first type of semi-conductor material and second layer positioned on said host layer and formed of a different type of semi-conductor material, a junction formed between said host and second layers, a plurality of electrodes connected electrically to the host layer at spaced locations therearound defining an observation field on said host layer, means capable of sensing voltages generated in the wafer when the observation field is exposed to a spot of light, said means being connected directly between selected ones of said electrodes, means for focusing light from a remote light source in a spot on said host layer within the observation field, said light spot releasing holes and electrons in the wafer layers thereby generating voltages between the spaced electrodes which vary with the position on the wafer where the lightspot impinges, said voltages being sensed by the voltage sensing means another electrode attached to the second wafer layer on the opposite side of the wafer from the observation field, and other means capable of sensing voltages generated in the wafer connected between said other electrode and at least two of said spaced electrodes to measure the intensity of the light spot.

7. A detector device comprising a semi-conductor wafer including a host layer of a first semi-conductor material and a second layer of a different semi-conductor material positioned on said host layer, a junction formed between said host and second layers, means for focusing light from a remote source into a spot on a selected area of the host layer of the wafer whereby one of said semi-conductor layers releases holes and the other of said layers releases electrons, a plurality of pairs of electrodes attached to the host layer about the selected wafer area, devices sensitive to voltages generated in the wafer due to the impinging light spot connected between selected pairs of said spaced electrodes, said voltage sensitive devices producing outputs which vary in response to the position on the wafer where the light spot impinges relative to the selected and connected pairs of electrodes, said outputs going through null conditions in each voltage sensitive device when the light spot is equidistant from the pair of electrodes connected thereto, another electrode attached to the second wafer layer on the opposite side of the wafer from the selected area, and other means capable of sensing voltages generated in the wafer due to the impinging light spot, said other means including means connected between said other electrode and at least two of said spaced electrodes.

8. A light sensitive detector comprising an element having two layers each formed of different material characterized by having different conductivity characteristics, a plurality of spaced electrodes attached to one of said layers about an observation area defined therebetween, voltage sensitive means connected between selected ones of said electrodes, means for focusing a spot of light on said one element layer in the observation area, said spot producing voltage changes in the element and voltages in the said voltage sensitive means which vary in response to the position of the light spot relative to said selected electrodes, another electrode attached to the other element layer opposite from the observation area, and other voltage sensitive means connected between at least one of said plurality of electrodes and the other electrode, said other voltage sensitive means including means sensitive to the voltage differences produced between the element layers due to the light spot, said voltage differences being proportional to the intensity of the impinging light.

9. Means for producing signals representing the location and distance of a remote object having a source of light thereon comprising light sensitive detector means including a wafer-like element having first and second layers formed by materials characterized by having distinct different conductivity characteristics, a junction formed between said first and second layers, a plurality of electrodes attached at spaced locations to the first wafer layer to define an observation area thereon, electricity sensitive means connected between selected pairs of said electrodes, means for focusing light from the light source on the remote object into a spot on the said first wafer layer in the observation area, said light spot producing electrical changes in the wafer element which can be sensed by the electricity sensitive means, said changes varying in response to the position of the light spot on the wafer relative to the spaced electrodes, and means for measuring the intensity of the light impinging on the wafer element including another electrode attached to the second wafer layer on the opposite side of the wafer from the observation area, and other electricity sensitive means connected between said other electrode and preselected ones of the aforementioned spaced electrodes, said other electrical sensitive means being responsive to voltage differences through the wafer element between the first and second wafer layers produced by the impinging light spot.

References Cited

UNITED STATES PATENTS

| | | | |
|---|---|---|---|
| 2,513,367 | 7/1950 | Scott | 250—203 |
| 2,282,422 | 4/1958 | Fuller | 29—25.3 |
| 2,879,405 | 5/1959 | Pankove | 250—211 |
| 3,028,500 | 4/1962 | Wallmark | 250—211 |
| 3,132,408 | 5/1964 | Pell | 29—25.3 |
| 3,211,911 | 10/1965 | Ruhge | 250—211 |

ARCHIE R. BORCHELT, *Primary Examiner.*

RALPH G. NILSON, *Examiner.*

M. ABRAMSON, *Assistant Examiner.*